United States Patent [19]
Empey

[11] 4,004,700
[45] Jan. 25, 1977

[54] HOPPER GATE FOR SELF-UNLOADING SHIPS

[75] Inventor: Robert M. Empey, Ontario, Canada

[73] Assignee: Allis-Chalmers Corporation, Milwaukee, Wis.

[22] Filed: Dec. 22, 1975

[21] Appl. No.: 643,312

[52] U.S. Cl. .............................. 214/15 D; 105/240; 222/503
[51] Int. Cl.² ........................................ B65G 67/58
[58] Field of Search ................. 214/14, 15 R, 15 D, 214/15 E, 12, 519, 83.36; 298/27; 198/54; 105/240, 248, 249; 222/504, 502, 503

[56] References Cited
UNITED STATES PATENTS

| 700,580 | 5/1902 | Torrent ............................... 298/27 |
| 711,632 | 10/1902 | Johnson ........................... 198/54 X |
| 1,999,837 | 4/1935 | Harvey .............................. 298/27 |
| 2,505,982 | 5/1950 | Meissner ........................ 214/15 D |
| 3,710,730 | 1/1973 | Austgen et al. ............... 105/240 X |

FOREIGN PATENTS OR APPLICATIONS 561,825  11/1957  Belgium ............................ 222/503

Primary Examiner—Frank E. Werner
Attorney, Agent, or Firm—Robert C. Sullivan

[57] ABSTRACT

A belt feeder gate for use in self-unloading ships of the type in which the hold of the ship is provided with a hoppered bottom including a plurality of hoppers overlying an unloading conveyor belt moving lengthwise of the ship. Each open hopper bottom is closed by a gate comprising two wheeled gate sections which are movable relative to each other along stationary tracks in a horizontal plane and in a direction laterally of the direction of travel of the underlying unloading conveyor belt. The respective longitudinally opposite wheeled ends of the respective gate sections project in underlying relation to longitudinally spaced "hog ridges" defined by the walls of adjacent hoppers, each "hog ridge" being an inverted V-shaped hollow space defined beneath two upwardly converging oppositely longitudinally inclined walls of two longitudinally adjacent discharge hoppers. The stationary tracks on which the wheeled gates move are also in underlying relation to, although not within, the respective "hog ridges," and the hydraulic rams which impart movement to the gate sections are housed within the "hog ridges." A further feature of the construction is the V-shaped axial cross-section of the wheels on the gate sections, which V-shaped cross-section rides on an inverted V-shaped track to prevent "play" or wobble of the wheeled gate relative to the tracks, thereby providing a constant and stabilized linear relation of the wheeled gate relative to the power means such as a hydraulic ram, which imparts movement to the gate sections.

8 Claims, 5 Drawing Figures

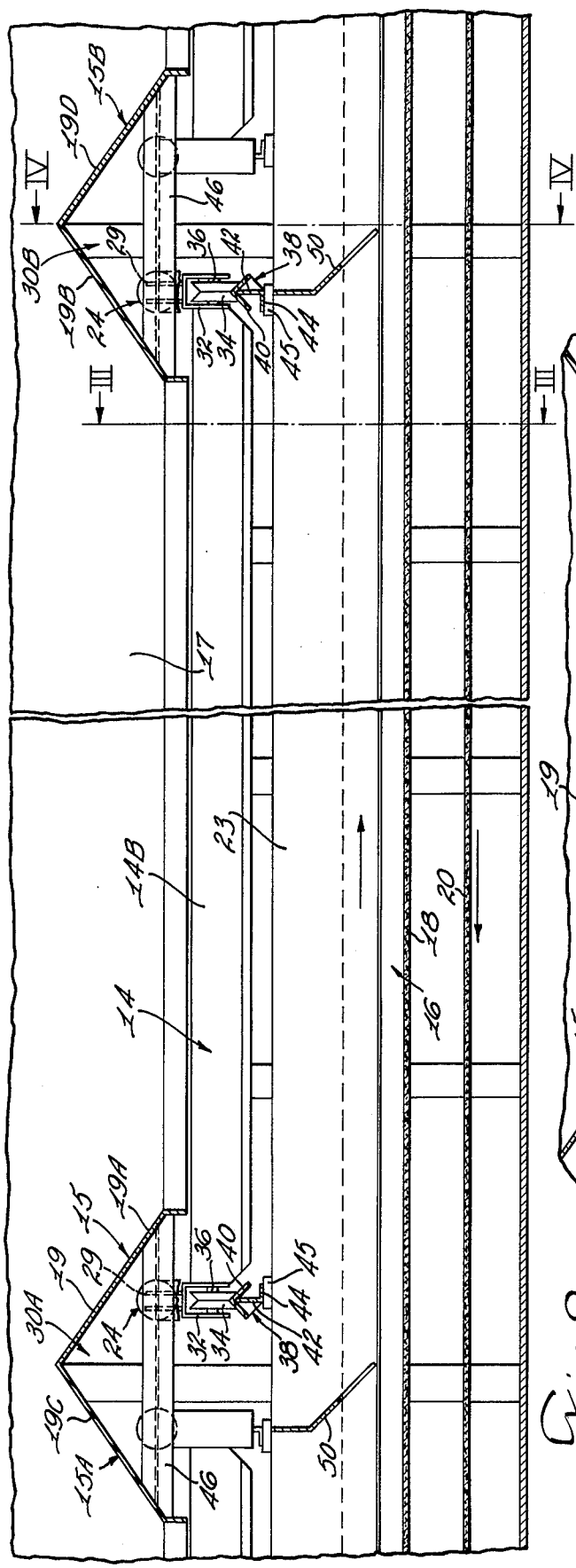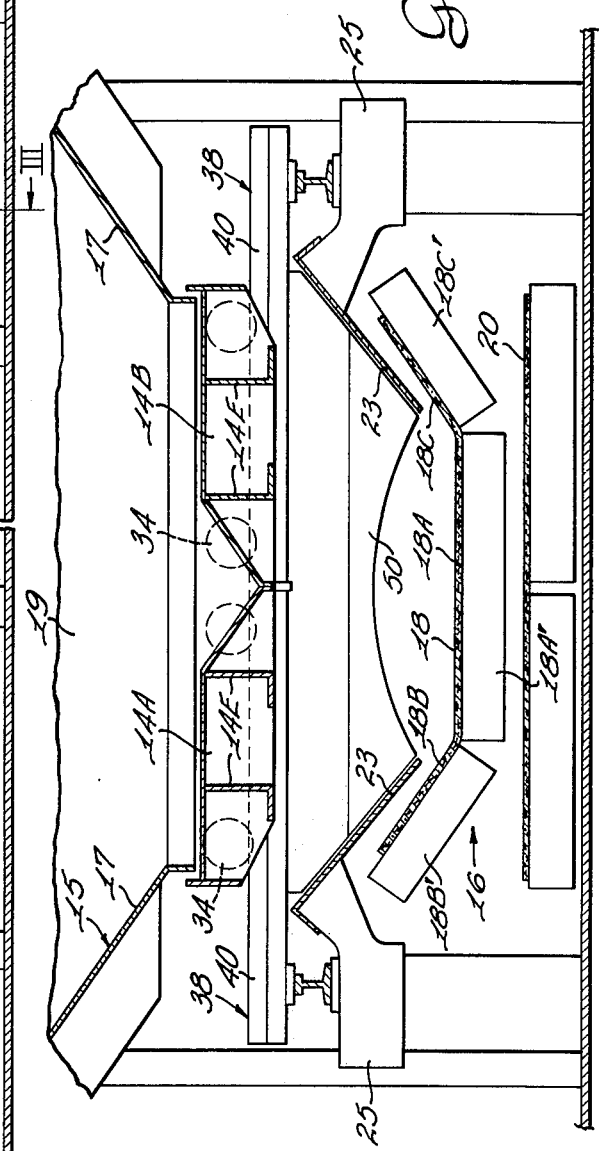

HOPPER GATE FOR SELF-UNLOADING SHIPS

BACKGROUND OF THE INVENTION

1. Field of the Invention

This invention relates to ship unloading apparatus and more particularly to belt feeder gates for discharging bulk material such as iron ore pellets, crushed stone, coal or the like from a ship hold onto an unloading conveyor belt beneath the ship hold.

2. Description of the Prior Art

In the prior art relating to unloading bulk material from the hold of a self-unloading ship having a hoppered bottom it has been customary to provide gates underlying the hopper openings at the lower end of the ship hold, which gates have been selectively openable to permit dispensing of bulk material from the open lower end of a given hopper onto an underlying conveyor belt which carries the bulk material thus unloaded to a suitable discharge point of the conveyor system, the underlying conveyor belt usually moving in a lengthwise direction relative to the longitudinal axis of the ship. The gates in the prior art positioned in underlying relation to the hopper bottoms have generally been movable in a direction parallel to or lengthwise of the conveyor belt as shown, for example, by U.S. Pat. Nos. 2,505,982 issued to John F. Meissner on May 2, 1950 and 3,191,998 issued to Charles L. Howlett on June 29, 1965. However, broadly speaking, it is also known in the prior art to provide in a ship unloading arrangement belt feeder gates positioned in underlying relation to the hopper opening and movable in a lateral direction relative to the direction of movement of the underlying belt, such arrangement being shown by U.S. Pat. Nos. 842,338, issued to Charles D. Ross on Jan. 29, 1907, and 1,756,518 issued to Levy McMillan on Apr. 29, 1930.

The use of hopper gates which move in a direction transversely or laterally of the direction of movement of the conveyor belt is preferable since it permits the laterally movable gate to be retracted to a position in underlying relation to the exterior surface of the laterally inclined walls of the associated overlying hopper where the laterally retracted gate is in completely non-interfering relation to the discharge gates of longitudinally contiguous hoppers. In contrast, where hopper discharge gates which move in a direction lengthwise of the unloading conveyor are used as in the aforementioned Meissner and Howlett patents, the longitudinal opening movement of a given hopper gate must be limited to prevent interference with the gates of longitudinally contiguous discharge hoppers.

The net result of this distinction between hopper discharge gates which move laterally of the underlying conveyor as compared to hopper gates which move longitudinally of the underlying belt conveyor is that hoppers having larger discharge openings or bottom mouths can be used with gates which move in a lateral direction relative to the direction of movement of the conveyor then can be used with gates which move in a direction parallel to the longitudinal movement of the conveyor.

A further advantage of hopper discharge gates which move in a lateral direction relative to the direction of movement of the underlying conveyor belt is that the operating mechanism for effecting opening and closing movement of the discharge gates can be located in what is known in the art as the "hog ridge" which is the inverted V-shaped hollow space defined beneath two upwardly converging oppositely longitudinally inclined walls of two longitudinally adjacent discharge hoppers. This feature just mentioned is shown per se by the aforementioned U.S. Pat. No. 1,756,518 issued to Levy McMillan.

In effectuating the opening and closing movement of the discharge gates of the hopper it is desirable that the gate be provided with wheels which move on tracks, which feature is broadly shown by the aforementioned United States patents to Meissner and Howlett, although as previously mentioned in the patents to Meissner and Howlett, the gate members are movable in a direction parallel to the lengthwise direction of travel of the underlying conveyor belts. An important feature of the present invention is the provision of a hopper discharge gate whose wheels are so constructed with relation to the tracks on which they run as to prevent any "play" or wobble of the wheels relative to the tracks, thereby insuring that the wheeled gate moves in a substantially constant and undeviating linear path of movement whereby to provide a constant and stabilized relation of the path of movement of the wheeled gate relative to the power means which imparts movement to the gate such as a hydraulic ram, for example. This feature does not appear to be shown by any of the aforementioned patents.

OBJECTS OF THE INVENTION

Accordingly, it is an object of the present invention to provide an improved belt feeder gate for dispensing bulk material from a hoppered ship hold or the like onto a moving conveyor belt, and including a pair of wheeled gate sections movable in a horizontal plane along tracks laterally of the path of travel of the conveyor belt, and in which the wheeled gate sections and the tracks on which they move are so related as to substantially prevent "play" between the gate wheels and the associated track on which the wheels move, and whereby to maintain linearity of the moving gates relative to the actuating rams.

It is another object of the invention to provide a belt feeder gate for a hoppered ship hold including fluid operated ram means for imparting a movement to two cooperating gate sections in a horizontal plane laterally of the path of travel of the conveyor belt and with the longitudinally spaced fluid operated rams for operating the gate being located in a pair of longitudinally spaced inverted V-shaped cross-section hog ridges, each hog ridge being defined by the two upwardly converging oppositely longitudinally inclined walls of two longitudinally adjacent hoppers.

In achievement of these objectives, there is provided in accordance with an embodiment of the invention, a belt feeder gate for use in self-unloading ships of the type in which the hold of the ship is provided with a hoppered bottom including a plurality of hoppers overlying an unloading conveyor belt moving lengthwise of the ship. Each open hopper bottom is closed by a gate comprising two wheeled gate sections which are movable relative to each other along stationary tracks in a horizontal plane and in a direction laterally of the direction of travel of the underlying unloading conveyor belt. The respective longitudinally opposite wheeled ends of the respective gate sections project in underlying relation to longitudinally spaced hog ridges defined by the walls of adjacent hoppers, each hog ridge being an inverted V-shaped hollow space defined beneath two upwardly converging oppositely longitudinally inclined walls of two longitudinally adjacent discharge hoppers. The stationary tracks on which the wheeled gates move are also in underlying relation to, although not within, the respective hog ridges, and the hydraulic rams which impart movement to the gate sections are housed within the hog ridges. A further feature of the construction is the V-shaped axial cross-section of the wheels on the gate sections, which V-shaped cross-section rides on an inverted V-shaped track to prevent play or wobble of the wheeled gate relative to the tracks, thereby providing a constant and stabilized linear relation of the wheeled gate relative to the power means, such as a hydraulic ram, which imparts movement to the gate sections.

Further objects and advantages of the invention will become apparent from the following description taken in conjunction with the accompanying drawings in which:

BRIEF DESCRIPTION OF THE DRAWINGS

FIG. 2 is a view in longitudinal section taken along substantially the longitudinal center line of the bottom opening of a given hopper showing one of the laterally movable gate sections of a given gate;

FIG. 3 is a view in transverse section taken along line III—III of FIG. 2 showing both of the gate sections in fully closed position in underlying and closing relation to the bottom opening of the overlying hopper;

DESCRIPTION OF THE PREFERRED EMBODIMENT

Figure 1:
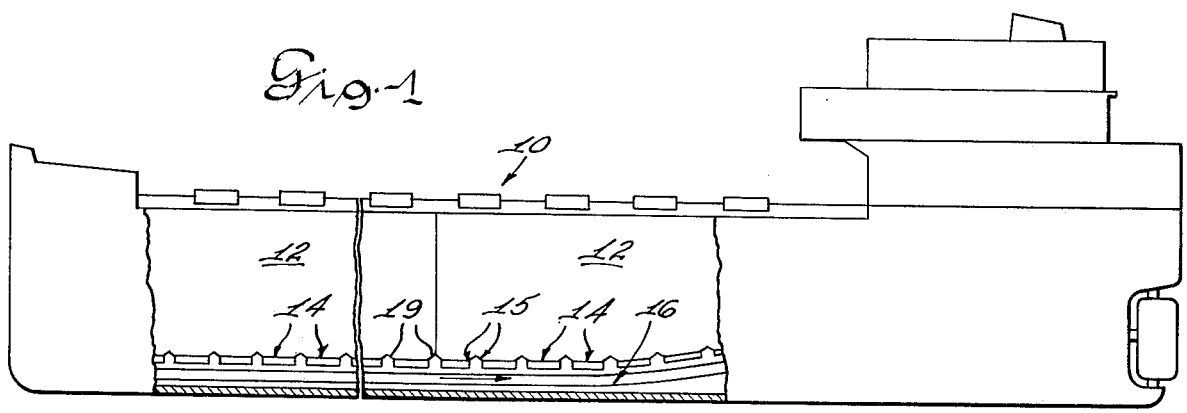
FIG. 1 is a diagrammatic view, partially in elevation and partially in longitudinal section, of a self-unloading cargo ship having a hold provided with a plurality of belt feeder gates, the plurality of belt feeder gates overlying a common moving conveyor belt onto which bulk material such as iron ore pellets, crushed stone, coal or the like is dispensed from the individual gates.
Figure 4:
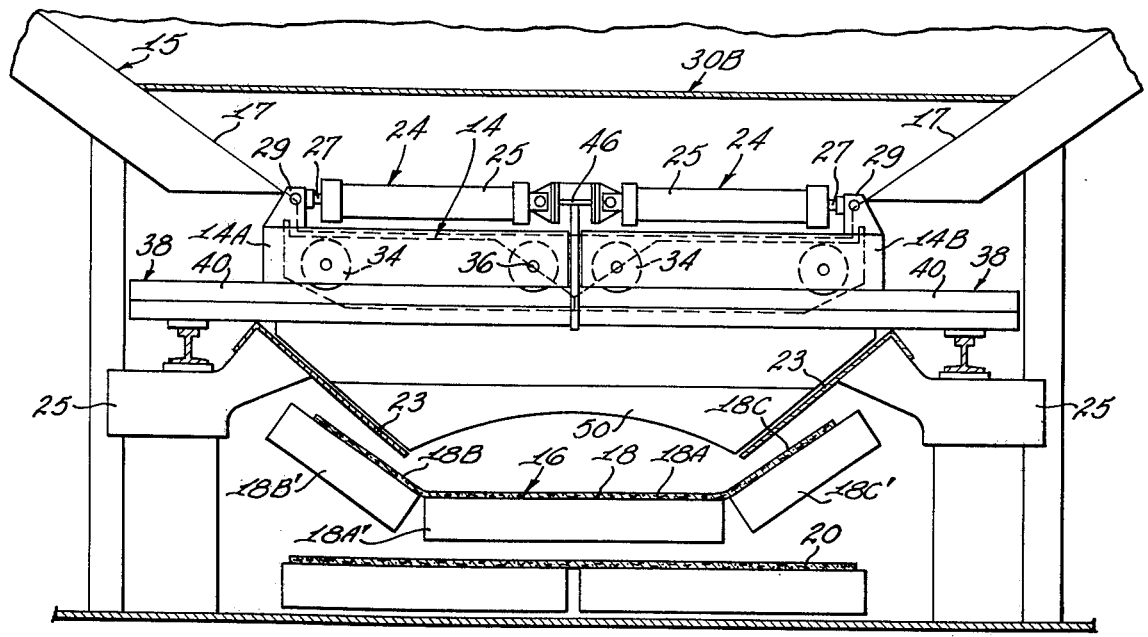
FIG. 4 is a view along section line IV—IV of FIG. 2 showing the hydraulic ram operating mechanisms for the two gate sections of the belt feeder gate underlying the given hopper, with the gate sections being shown in closed position.

Referring now to FIG. 1, there is shown a ship generally indicated at 10 of the type adapted for carrying bulk cargo such as iron ore pellets, crushed stone, coal, etc. The ship 10 includes a hold generally indicated at 12 and shown as extending for a substantial part of the length of the ship. However, the hold 12 shown in FIG. 1 could be subdivided by bulkheads or partitions extending transversely of the longitudinal axis of the ship into a plurality of smaller holds. The hold 12 is filled with a bulk material which may be of a type previously mentioned. If the hold 12 is subdivided by transverse bulkheads or partitions, different types of bulk material may be carried by different sections of the hold. At the lower end of the hold 12, a plurality of belt feeder gates, each generally indicated at 14, are provided in overlying relation to a conveyor belt generally indicated at 16. The lower end of hold 12 is provided with a separate discharge hopper generally indicated at 15 (FIG. 1) corresponding to each gate 14, the bulk material passing through the respective discharge hoppers 15 to the respective gates 14, and thence onto the underlying conveyor belt 16. The downwardly tapered shape of each discharge hopper 15 is defined by the longitudinally inclined hopper walls 19 (FIGS. 1 and 2) and by the laterally inclined hopper walls 17 (FIGS. 3 and 4). In describing the hoppers and the gates, the terms "longitudinally" and "laterally" are relative to the longitudinal axis of the ship.

The conveyor belt 16 includes an upper run 18 which moves in the direction of the arrow, namely, from left to right relative to the view of FIG. 1, and a return run 20. The upper run 18 of conveyor belt 16 is troughed, as best seen in FIGS. 3 and 4, and includes a horizontal base portion 18A and upwardly inclined opposite side portions 18B and 18C. The horizontal surface portion 18A of the upper run 18 of conveyor belt 16 is supported by troughing rollers 18A' lying in a horizontal plane, and inclined portions 18B and 18C of the upper run 18 are supported by upwardly inclined troughing rollers 18B' and 18C', respectively, all of which is well known in the art.

Oppositely disposed upwardly and outwardly inclined skirt members each indicated at 23 supported by suitable support structure 25 extend substantially continuously for the entire length of conveyor 16 contiguous opposite sides of conveyor 16. The function of skirt members 23 is to confine material deposited on the conveyor from spillage laterally outwardly of the conveyor, particularly when hopper gates 14 are being used as "bulk flow belt feeder gates," as will be described more fully hereinafter.

Positioned in immediate underlying relation to the discharge opening of a given hopper 15 is a corresponding gate generally indicated at 14 comprising a pair of cooperating gate sections 14A and 14B which are movable in opposite directions in a horizontal plane and in a direction transversely of the longitudinal direction of movement of conveyor belt 16 from a closed position in which the facing lateral ends of the respective gate sections 14A and 14B are in abutting relation to each other along the longitudinal centerline of the overlying hopper opening to a predetermined desired open position. The respective gate sections 14A and 14B are retractible to provide a controlled opening of the discharge opening of the associated hopper 15 under the mechanical driving influence of hydraulic rams generally indicated at 24 which will be described more fully hereinafter. As will be explained in more detail hereinafter, gates 14A and 14B may be opened to such a degree as to provide either a partial opening or a complete opening of the overlying hopper bottom, depending upon the nature of the material being discharged through the gates.

As best seen in FIG. 2, it will be noted that the longitudinally inclined walls 19 of the specific hopper 15 for which the gate is being described have been identified as 19A and 19B, respectively. Longitudinally inclined wall 19A of the given hopper 15 have a junction with the contiguous but oppositely inclined wall 19C of the upstream hopper 15A, which is immediately upstream of the given hopper 15, to define a first hog ridge 30A which is defined by the walls 19C and 19A, respectively. The hog ridge is an inverted V-shaped hollow space extending laterally of the direction of movement of conveyor belt 16 and in a direction laterally relative to the longitudinal axis of the ship. In a similar manner, the downstream longitudinally inclined wall 19B of the given hopper 15 has a junction with the oppositely longitudinally inclined wall 19D of the contiguous downstream hopper 15B to define a second hog ridge 30B. Such hog ridges are conventional and well known in the art relating to hoppered ship holds.

It will be noted from an examination of FIG. 2 that the gate section 14B extends longitudinally on either side of the hopper opening of hopper 15 and into underlying relation to hog ridge 30A on the upstream side of the given gate and also into underlying relation to the hog ridge 30B on the downstream side of the given gate 14, the terms "upstream" and "downstream" being used with reference to the direction of travel of the conveyor belt. The opposite longitudinal ends of gate section 14B extends beneath hog ridges 30A and 30B in a similar manner to gate section 14A. Each gate section 14A, 14B, comprises a top plate bent downwardly to form oppositely disposed longitudinally extending flanges, with angle stiffener members 14E welded to the under surface of the top plate of each gate section 14A, 14B to provide a structural reinforcing action. Each of the gate sections 14A, 14B comprises at each longitudinal end thereof a side frame generally indicated at 32 which is a plate bent to U-shape and welded or otherwise suitably attached to the main body of the respective gate section. Each U-shaped side frame 32 of the respective gate sections defines a wheel pocket for rotatably supporting along its respective length two or more wheels indicated at 34. Each wheel is of the V type, that is, V-shaped in axial cross-section, machined from hot rolled steel shafting, and is rotatably supported on the corresponding side frame 32 by a stationary cold rolled steel pivot pin 36 which is supported on side frame 32. Wheel 34 rotates on the stationary pin 36. The wheels 34 at the opposite longitudinal ends of the given gate section 14A or 14B are adapted for movement on cooperating longitudinally spaced tracks generally indicated at 38 which extend transverse of the direction of travel of conveyor belt 16. Each track 38 comprises a first angle member 40 which has its apex rigidly secured to the upper end of the vertical leg of a second angle member 42, the horizontal leg 44 of the second angle member 42 being suitably secured to a suitable horizontal support surface 45. The inverted V-shaped orientation of angle member 40 provides a cooperating interlocking relation between the V-shaped track angle 40 and the V-shaped cross-section of wheels 34, whereby to substantially resist any play of the gate wheels 34 relative to the V-shaped track angle 40. The angle member 40 which engages the V-shaped cross-section wheels 34 can be supported on any suitable supporting surface and does not necessarily have to be supported by the second angle member 42 as shown and described. As best seen in FIG. 2, tracks 38 underlie but are not within the respective hog ridges 30A and 30B.

This closely interfitting relation between the V-shaped wheels 34 carried by the gate section 14A or 14B and the V-shaped cross-section of the track angle 40 insures that the gate moves in a constant and true linear path with respect to the hydraulic rams 24 which impart opening and closing motion to the respective gate sections 14A, 14B.

Each of the gate sections 14A, 14B is provided at its longitudinally opposite ends with a corresponding hydraulic ram 24, making a total of four hydraulic rams for the two gate sections 14A and 14B. The arrangement of one of the hydraulic rams 24 will be explained, it being understood that the other hydraulic rams 24 are similarly operatively connected to their corresponding gate sections 14A or 14B, as the case may be.

Figure 5:
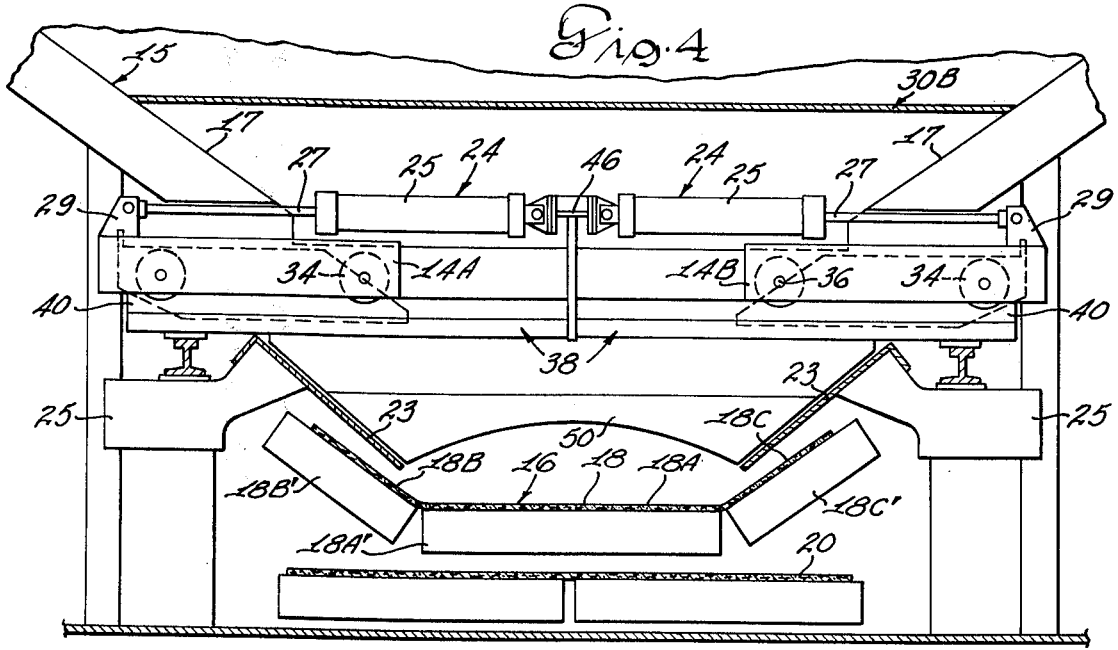
FIG. 5 is a view similar to FIG. 4 but showing the gate sections in open position.

Referring to FIGS. 2, 4 and 5, it can be seen that a given hydraulic ram 24 lies in the same vertical plane as the corresponding U-shaped side frame 32 and at a level slightly above the upper surface of the given side frame 32 and of the corresponding gate section 14A or 14B. Each hydraulic ram 24 comprises a cylinder 25 and a piston rod 27. The inner end of each piston rod 27 is connected to a piston interiorly of the ram cylinder 25. The exterior end of piston rod 27 which is external of ram cylinder 25 is connected to a bracket or the like 29 which is fixed to the upper surface of the U-shaped side frame 32, which in turn is secured to the corresponding gate 14A or 14B. The laterally inner end of the ram cylinder 25 (i.e., the end of ram cylinder 25 which lies closest to the longitudinal vertical plane in which lies the longitudinal centerline of the overlying hopper opening) is connected to a longitudinally extending support member 46 which bridges the lower end of the corresponding hog ridge 30A or 30B and which support 46 lies substantially in or closely contiguous the aforementioned longitudinal vertical plane of the longitudinal centerline of symmetry of the overlying hopper opening and of the underlying conveyor belt 16.

Because the ram 24 and the connection of piston rod 27 to bracket 29 of gate section 14A (or 14B) all lie in a common vertical plane with the underlying V-shaped track 40, the thrust exerted by ram 24 on the corresponding gate section is in a common vertical plane with track 40.

As seen in FIG. 4, when the piston rods 27 of the two rams 24 associated with each gate 14A or 14B are in their fully retracted position within the respective ram cylinders 25, the gate 14 comprising gate sections 14A, 14B is in closed position, with the oppositely disposed gates 14A or 14B being in abutting relation to each other. However, as shown in FIG. 5, when sufficient oil is introduced into the ram cylinders 25 to cause the respective pistons 27 to advance out of ram cylinders 25, the respective gates 14A and 14B are moved in laterally opposite directions toward either a partially open or a fully open position, as desired. In moving toward the fully open position shown in FIG. 5, the opened gates 14A and 14B underlie the exterior surface of the laterally inclined walls 17 of the associated hopper 15.

The arrangement of the ram 24 as shown in the drawings in accordance with which the piston rod 27 is substantially completely retracted into the ram cylinder 25 when the corresponding gate section is in closed position has several advantages including the following:

(1) since the gate is in closed position as seen in FIGS. 3 and 4 for a far greater percentage of the time than it is open, the piston rod 27 is maintained in a sheltered, protected position within the ram cylinder 25 for most of the time (i.e., when the gate is shut), thereby protecting piston rod 27 from possible adverse environmental or other adverse affects to which piston rod 27 might be subjected if it were in outwardly projected position from ram cylinder 25 most of the time;

(2) when the piston rod 27 is retracted in the closed position of the gate as in FIGS. 3 and 4 (the gate being closed most of the time), the piston rod 27 and the bearings therefor are subjected to less mechanical stresses than if the ram 24 were positioned and arranged that the piston rod 27 was extended outwardly from ram cylinder 25 when the gate section 14A or 14B was in closed position.

The gates 14 including the gate sections 14A, 14B may be operated in accordance with either of two different modes of operation:

Mode 1: Sufficient hydraulic fluid may be admitted to the respective cylinders 25 of the four hydraulic rams (two to each gate section) associated with the two gate sections 14A, 14B to cause a desired partial opening of the gate sections 14A, 14B relative to each other (and thereby partially uncover the overlying hopper bottom) to thereby control by the degree of the opening of gates 14A, 14B relative to each other the amount of bulk material dispensed from an overlying hopper 15 through the gate 14 onto the underlying conveyor belt 16. The controlled opening of the gate sections 14A, 14B causes the controlled degree of opening of the gate sections 14A, 14B to have a valve action which controls the flow through the partially open gate onto the underlying conveyor belt. This type of control of the gate opening is generally used for high density bulk material such as iron ore pellets and crushed stone, for example. On the other hand, this manner of control of bulk flow is not generally suitable for low density material such as coal, since coal tends to form an arch over the opening defined by the partially opened gate sections 14A, 14B which restricts or prevents flow through the partial gate opening.

When the degree of opening of gate sections 14A, 14B is controlled to provide a valve action controlling the flow of bulk material through the gate onto the underlying belt conveyor, as just described, the use of a "striker plate" (or "shear plate") 50 in association with the gate 14 is not necessary, since the control of material flow is controlled solely by controlling the degree of gate opening.

Mode 2: The gate 14 may also be used as a "bulk flow belt feeder gate," in which case the gate sections 14A, 14B are opened completely to completely uncover the bottom opening of the overlying hopper. Gate 14 is used as a "bulk flow belt feeder gate" as just described particularly when dispensing low density material, such as coal, for example, onto the underlying conveyor belt. This permits the bulk material (such as coal) to flow in an uncontrolled manner from the overlying hopper 15 onto the underlying conveyor belt 16. If the gate 14 is used as a "bulk flow belt feeder gate" as just described, it is necessary to use a "striker plate" 50 (sometimes known as a "shear plate") immediately contiguous the downstream (relative to direction of movement of conveyor belt 16) end of the given gate 14, as diagrammatically indicated at 50 in FIG. 2. The striker plate 50, which forms no part of the present invention, is so shaped as to control the cross-sectional shape of the load of bulk material passing from beneath the associated bulk flow belt feeder gate onto the conveyor belt downstream of the given gate, the striker plate cooperating with the associated bulk flow belt feeder gate to provide what in effect is a material flow metering action which determines the tonnage of bulk material delivered by the bulk conveyor per unit time.

Since the striker plate 50 forms no part of the present invention, it is only shown diagrammatically in the drawings as being in a fixed "down position" in order to simplify the drawings. However, if a plurality of hopper gates 14 feed a common underlying conveyor belt, as shown in FIG. 1 of the drawings, with the gates being used as "bulk flow belt feeder gates," and each gate having an associated striker plate 50 located contiguous the downstream end of the corresponding hopper gate, relative to the direction of the conveyor travel, the striker plate 50 corresponding to each gate 14 should be interlocked with the position of the associated gates 14A, 14B in such manner that when the gates 14A, 14B, are in open position, the associated striker plate 50 is in a down operative position, whereas when the respective gates 14A, 14B are in fully closed position, the associated striker plate 50 should be in an upwardly retracted "out-of-the-way" position. An arrangement in which a bulk-flow belt feeder gate is interlocked with its associated striker plate in the manner just described is disclosed and claimed in copending United States patent application Ser. No. 643,309 of David W. Dibben, filed Dec. 22, 1975, and entitled "Bulk Flow Belt Feeder Gate with Interlocked Striker Plate," assigned to the same assignee as the present patent application.

Where a ship is equipped with hopper gates respectively having striker plates associated therewith for use of the gates as "bulk flow belt feeder gates," as just briefly summarized herein and as set forth in the aforementioned patent application of David W. Dibben, it is also possible to use the same apparatus without change in accordance with mode 1 hereinbefore described in which a controlled partial opening of the gate sections 14A, 14B is used for regulating the flow of high density material such as iron ore pellets or crushed stone onto the underlying conveyor belt. The reason for this is that when the hopper gates are opened to a partial opening in accordance with "mode 1" of operation hereinbefore described if interlocked striker plates of the type disclosed by the aforementioned patent application of David W. Dibben are associated with the respective gates, the striker plates will automatically move down into operative position upon a partial opening of the gates, but the height of the high density material moving along the conveyor belt will be so controlled by the degree of gate opening as to cause the high density material to pass beneath the striker plates with ample clearance so that the striker plate does not affect the contour of the load of high density bulk material moving along on the conveyor belt.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A belt feeder gate for discharging a bulk material from a given hopper of a hoppered ship hold or the like onto an unloading conveyor belt positioned in underlying relation to said feeder gate, and in which the given hopper has a downwardly tapered shape defined by a first pair of oppositely disposed hopper walls inclined longitudinally relative to the longitudinal path of travel of said conveyor belt and by a second pair of oppositely disposed hopper walls inclined laterally relative to the longitudinal path of travel of said conveyor belt, said given hopper being one of a plurality of similar hoppers positioned in overlying relation to said conveyor belt along the length of said conveyor belt, the oppositely disposed longitudinally inclined hopper walls of the given hopper defining with longitudinally inclined walls of hoppers lying contiguous the given hopper upstream and downstream of the given hopper relative to the travel of said conveyor belt a pair of longitudinally spaced hog ridges lying on either side of the given hopper, wherein the improvement comprises forming said belt feeder gate as two cooperating gate sections adapted when in closed position to close the discharge opening of said given hopper, said two gate sections being mounted for movement in a horizontal plane in a direction laterally of the path of travel of said conveyor belt, said two cooperating gate sections being movable in opposite directions toward and into abutting relation to each other to close said discharge opening of said given hopper, said two cooperating gate sections being movable in opposite directions away from each other to permit discharge of material from the discharge opening of said given hopper, the respective opposite longitudinal end portions of each gate section being respectively in underlying relation to a corresponding one of said pair of longitudinally spaced hog ridges lying on either side of said given hopper, wheel means carried by each of said gate sections, stationarily mounted track means extending laterally of the longitudinal path of movement of said conveyor belt and adapted to be engaged by said wheel means to rollingly support each of said gate sections in its opening or closing movement, said cooperating gate sections when in open position having at least a substantial portion thereof stored externally of said given hopper and in underlying relation to the external surface of said walls of said given hopper which are inclined laterally relative to the longitudinal path of travel of said conveyor belt, power means operatively associated with each of said gate sections for imparting opening or closing movement to the respective gate sections, said power means being positioned in at least one of said hog ridges associated with said given hopper corresponding to said belt feeder gate.

2. A belt feeder gate as defined in claim 1 in which said power means operatively associated with each of said gate sections comprises fluid motor means.

3. A belt feeder gate as defined in claim 1 in which said power means comprises fluid-operated ram means located in at least one of said hog ridges and operatively connected to said gate sections whereby to impart opening and closing movement to said gate sections.

4. A belt feeder gate as defined in claim 3 in which each gate section has associated with it a separate fluid-operated ram, and a given fluid-operated ram includes a piston rod operatively connected to a corresponding gate section on a longitudinal end portion of said gate section underlying one of said hog ridges, said ram and said piston rod lying in substantially a common vertical plane with a wheel-supporting track of said stationarily mounted track means, said wheel-supporting track underlying said longitudinal end portion of said gate section.

5. A belt feeder gate as defined in claim 4 which said fluid-operated ram means includes a cylinder which is supported at its closed end contiguous the vertical plane of the longitudinal centerline of the bottom opening of the corresponding overlying hopper, said ram means being in overlying relation to the plane of the upper surface of said gate and extending parallel to and in substantially a common vertical plane with said track which underlies said portion of said gate section, said piston rod projecting through the opposite end of said ram cylinder, said piston rod being operatively connected to said gate section whereby to impart opening and closing movement to said gate section.

6. A belt feeder gate as defined in claim 5 in which substantially the entire length of said cylinder of said fluid-operated ram means overlies its corresponding gate section when said gate section is in closed position, and the piston rod of the corresponding fluid-operated ram means is retracted for substantially most of its length of said cylinder of said corresponding ram means when said gate section is in said closed position, said piston rod being operatively attached to the corresponding gate section whereby to impart opening and closing movement to said gate section.

7. A belt feeder gate as defined in claim 1 in which the wheels carried by said gate sections are of V-shape in axial cross-section, and the track engaged by said wheels is of inverted V-shaped cross-section whereby to mate with the V-shaped cross-section wheels to prevent play or wobble of said wheels relative to said tracks and whereby to provide a constant and stabilized relation of the path of movement of the wheeled gate sections relative to the power means which imparts opening or closing movement to the respective gate sections.

8. A belt feeder gate as defined in claim 1 in which said conveyor belt travels in a direction substantially lengthwise of said ship.

* * * * *

UNITED STATES PATENT OFFICE
CERTIFICATE OF CORRECTION

Patent No. 4,004,700            Dated January 25, 1977

Inventor(s) Robert M. Empey

It is certified that error appears in the above-identified patent and that said Letters Patent are hereby corrected as shown below:

The cover sheet should be corrected to read as follows:
 [73] Assignee: Allis-Chalmers Canada, Limited,
                    Lachine, Quebec, Canada Column 10, line numbered 10, after "4" --- in --- should be inserted.

Signed and Sealed this

Tenth Day of May 1977

[SEAL]

*Attest:*

RUTH C. MASON
*Attesting Officer*

C. MARSHALL DANN
*Commissioner of Patents and Trademarks*